United States Patent
Steiger et al.

(10) Patent No.: US 9,716,971 B2
(45) Date of Patent: Jul. 25, 2017

(54) INSPECTING EQUIPMENT OF A POWER SYSTEM

(71) Applicant: ABB Technology AG, Zurich (CH)

(72) Inventors: Olivier Steiger, Zurich (CH); Yannick Maret, Dättwil (CH); Eric Harper, Cary, NC (US); Martin Naedele, Zurich (CH); Michal Orkisz, Cracow (PL)

(73) Assignee: ABB Schweiz AG, Baden (CH)

( * ) Notice: Subject to any disclaimer, the term of this patent is extended or adjusted under 35 U.S.C. 154(b) by 922 days.

(21) Appl. No.: 14/046,370

(22) Filed: Oct. 4, 2013

(65) Prior Publication Data

US 2015/0099531 A1    Apr. 9, 2015

(51) Int. Cl.
*G01R 31/00*    (2006.01)
*H04W 4/02*    (2009.01)
*G06Q 10/00*    (2012.01)
*G06Q 50/06*    (2012.01)

(52) U.S. Cl.
CPC .............. *H04W 4/02* (2013.01); *G06Q 10/20* (2013.01); *G06Q 50/06* (2013.01)

(58) Field of Classification Search
CPC ........ G01R 1/071; H04H 20/14; H04H 20/28; H04H 20/30; H04H 2201/70; H04H 40/18; H04H 60/13; H04H 60/21; H04H 60/23; H04H 60/27; H04H 60/31; H04H 60/33; H04H 60/37; H04H 60/40; H04H 60/41

See application file for complete search history.

(56) References Cited

U.S. PATENT DOCUMENTS

2008/0084332 A1*  4/2008  Ritter .................... G06Q 10/06
                                                                 340/989

* cited by examiner

*Primary Examiner* — Roy Y Yi
(74) *Attorney, Agent, or Firm* — Taft Stettinius & Hollister LLP (57) ABSTRACT

A method of inspecting equipment of a power system can involve identifying a geographical area including a presumed faulty piece of equipment with a central computer system of the power system; determining a contact (e.g., a person) at the geographical area; sending a request for inspecting local equipment in the geographical area to the person; taking a picture, by the person, of a piece of local equipment; transmitting the picture to the central computer system; and evaluating at the central computer system, whether the piece of local equipment in the picture is faulty or not.

8 Claims, 4 Drawing Sheets

INSPECTING EQUIPMENT OF A POWER SYSTEM

FIELD

The present disclosure relates to the field of supervising and maintaining electrical power systems. For example, the disclosure relates to a method of inspecting equipment of a power transmission or distribution system.

BACKGROUND INFORMATION

Electrical power systems, such as power transmission and distribution networks, have been periodically inspected for existing or impending damage. For instance, the growth of trees and vegetation that might eventually disrupt power lines can be regularly monitored. Similarly, after catastrophic events such as floods, storms or lightning, damaged equipment (e.g., broken power masts, short-circuited transformers) may have to be located and inspected in order to determine the cause of damage and decide on necessary repairs. Although remote inspection using drones or webcams is nowadays possible, inspection is still essentially performed on site by humans.

Human inspection of power systems is still the most common solution, but it also can entail some substantial drawbacks. For example, it can be expensive due to labor cost and because of prolonged idle times between consecutive incidents. It may also be time-consuming due to long distances that need to be traveled in order to locate the damage. This may be of particular relevance when response time is a factor, such as after catastrophic events. Finally, as a rule, it is often that maintenance teams are deployed twice: first to locate and assess the damage, then—after fetching all necessary equipment and spare parts—to perform repairs. This may lead to additional delays.

High cost and long response times can be sometimes mitigated by using unmanned aerial vehicles (UAVs, drones) to perform the inspection tasks. However, specialized personnel still operate the drones, and their deployment is not immediate.

SUMMARY

A method is disclosed of inspecting equipment of a power system, the method comprising: identifying a geographical area including a presumed faulty piece of equipment with a central computer system of the power system; determining a contact (e.g., a person or communication device of a person) at the geographical area; sending a request for inspecting local equipment in the geographical area to the contact; taking a picture, via the contact, of a piece of local equipment; transmitting the picture to the central computer system; and evaluating whether the piece of local equipment in the picture is faulty or not.

A non-volatile computer-readable medium is disclosed, for storing an application for a mobile device, the application, when executed by a processor of the mobile device, being configured for receiving a request for inspecting local equipment in a geographical area from a central computer system; providing assistance for locating a piece of local equipment and for taking a picture of the piece of local equipment; and transmitting the picture to the central computer system.

A non-volatile computer-readable medium, for storing an application for a central computer system is also disclosed, the application, when being executed by a processor of the central computer system, being configured for: identifying a geographical area including a presumed faulty piece of equipment; determining a mobile device at the geographical area; sending a request for inspecting local equipment in the geographical area to the mobile device; receiving a picture of a piece of local equipment from the mobile device; and evaluating, whether the piece of local equipment in the picture is faulty or not.

BRIEF DESCRIPTION OF THE DRAWINGS

The subject-matter will be explained in more detail in the following text with reference to exemplary embodiments which are illustrated in the attached drawings, wherein.

In principle, identical parts are provided with the same reference symbols in the figures.

DETAILED DESCRIPTION

The present disclosure describes embodiments which can simplify the inspection of equipment of a power system.

For example, an exemplary method of inspecting equipment of a power system is disclosed. A power system may be a large-scale power distribution system. A power system may include a power transmission and/or distribution network. Pieces of equipment of a power system may be masts, power poles, power lines, overhead lines, transformers, breakers, switches and in general any electrical component of a power system.

According to an exemplary embodiment, the method can include identifying a geographical area including a presumed faulty piece of equipment by means of a central computer system of the power system; determining a person at (in or near) the geographical area; sending a request for inspecting local equipment in the geographical area to the person; and taking a picture, by the person, of a piece of local equipment. Next, the picture is transmitted to the central computer system and evaluated, at the central computer system, in order to determine whether the piece of local equipment in the picture is faulty or not; or the picture is evaluated, at a mobile device of the person prior to transmission, and subsequently transmitted to the central computer system in the affirmative only.

The method may be considered a method of assisted visual inspection of a power system, because rather than specialized personnel, persons already residing at, or close to, the presumed faulty piece of equipment perform tasks of the inspection at the geographical area of the piece of equipment.

The geographical area may be a small area around a piece of equipment and/or may be identified by GPS coordinates. However, the geographical area also may be a town, a street and/or a building.

The person receiving the request (for example on a mobile device) may be a local resident instead of specialized personnel to inspect the power system.

The person receiving the request may be a customer of a power company operating the power system and/or the central computing system. Instead of specialized personnel to perform network inspection tasks, the inspection is (at least partially) performed by power company customers.

Assisted inspection of power networks by persons already at the inspection site (such as special persons registered at the central computing system or customers of a power company) may lead to decreased response times and cost. Therefore, financial losses to the producers, distributors and also to the consumers of electric power due to power outages may be significantly reduced. There also may be a potential for increasing intangible value (goodwill) with customers by involving them in the process and directly managing their expectations for when power will be restored. Further, labor cost incumbent to the power company can be kept at a minimum.

The request may be sent via a data communication network (Internet, mobile phone network) to the person performing the inspection. For example, the person may have a mobile device, like a smartphone, that is registered by the central computing system of the power company. During the registration process, an application (a computer program) may be installed on the mobile device that is adapted to communicate with the central computing system. Also the home of the person and/or the actual position of the mobile device may be registered for identifying persons in the geographical area.

The application on the mobile device may also help the person to take a picture of the piece of equipment. For example, the application may determine a position of the piece of equipment (for example via GPS coordinates) and/or may provide an archived picture of the piece of equipment, such that the person may easily identify the piece of equipment. For example, the piece of equipment may be visible from the actual position of the person and/or the application may guide the person to the site of the piece of equipment.

When the picture is taken, the person may transmit the picture via the application to the central computing system, for example via the data communication network. The picture may be annotated with further information input by the person, such as the actual position of the person and/or a possible damage to the equipment according to the opinion of the person.

According to an exemplary embodiment, the geographical area is identified based on at least one of: weather conditions in that area, a regular event, a person residing in the geographical area, and a condition or status of the electricity supply in the area, e.g., whether power is currently available or not.

For example, in the case of a storm, the central computing system may receive or request data from a weather service, which may inform about geographical areas with high wind speed or gusts of winds. For example, requests for inspections may be sent to persons/mobile devices in all geographical areas, in which such extreme weather conditions have occurred.

Furthermore, an inspection of a geographical area may be started by a regular event, for example in regular time intervals, such as every year. The method may lower costs and/or time for performing regular or even continuous inspections for preventive purposes. This can provide a baseline for presenting images of undamaged equipment, and can help to detect defects early and to schedule maintenance activities accordingly, thus minimizing downtimes.

It is not only possible that the inspection is triggered centrally by the central computing system but also locally at the geographical area. For example, a person/customer noticing a power outage may inform the central computing system (for example via the application, via a telephone call, etc.) that in his geographical area something is faulty. Ultimately, it is also possible for the person (customer) to trigger, spontaneously, the inspection task without a prior request from the central computer system.

According to an exemplary embodiment disclosed herein, determining the person can include: registering the person at a central computer system of the power system; receiving GPS coordinates of a mobile device of the person in the central computer system; and determining the person by checking, whether the GPS coordinates of the mobile device are at the geographical area.

For example, dedicated customers of the power company may register as local inspection persons (for example for receiving a revenue with their power bill). An application provided by the power company that is running in a mobile device of the customer/person may help during the registration process, in which also the person is linked with a geographical area, for example by his home address or the actual position of his mobile device.

In the case where a specific geographical area is to be inspected, the central computing system may check for persons linked with the geographical area and may select one of the persons to send the request to him or her.

According to an exemplary embodiment, the request for inspecting local equipment can be indicative of a piece of local equipment. On the one hand it is possible that the person is requested to take pictures of all pieces of equipment in the geographical area or of all pieces of equipment that are faulty according to his opinion. On the other hand, the request may indicate a specific piece of equipment to be inspected. For example, the request may include an archived picture or a position of the piece of equipment to be inspected.

According to an embodiment disclosed herein, the request for inspecting local equipment can include GPS coordinates of a piece of local equipment, and the method can include guiding the person to the piece of local equipment by the GPS coordinates. For example, the mobile device may include an application that guides the person to a specific location via the aid of GPS coordinates.

According to an exemplary embodiment, the method can include determining GPS coordinates of the person, when taking the picture; and transmitting the determined GPS coordinates together with the picture to the central computing system. In other words, the picture may be geo-tagged with the position of the piece of equipment.

According to an exemplary embodiment, the request for inspecting local equipment can include a request for annotation, and the method can include annotating the taken picture, whether the piece of local equipment is faulty or not according to the opinion of the person. In general, further information about the piece of equipment that may be input by the person into the mobile device via the application may be transmitted together with the picture to the central computing system. While a picture is certainly an effective way to determine damage to electrical equipment, supplementary means are also possible. For instance, textual/form feedback provided by the user, or possibly audio feedback about uncommon vibrations or electric arcs may be the subject of an annotation to a picture as well as constitute a message content of its own.

The step of evaluating, or analyzing, a picture can be done automatically, e.g. using image processing, artificial intelligence, inference from data provided by the customer, as well as manually by an operator inspecting the received images. In addition to determining whether the equipment is faulty or not, more refined investigations such as type and severity of the fault, cause of the fault, etc. are likewise possible.

According to an exemplary embodiment, the method can include, before transmitting the picture to the central computer system, automatically verifying, whether the picture shows a piece of equipment of the power system. For example, the application of the mobile device may verify, whether the picture really shows a piece of electrical equipment and/or whether the picture shows the complete piece of equipment and/or whether it shows the requested piece of equipment. Other image inspection tasks are possible; e.g., verifying image quality/contrast/brightness. An exemplary reason for performing the verification task before transmitting the picture is to save bandwidth and enable real-time feedback to the user of the app.

A further aspect disclosed herein relates to a, for example non-volatile, computer-readable medium, for storing an application for a mobile device, the application, such that when loaded the application will be executed by a processor of the mobile device. A non-volatile computer-readable medium may be a floppy disk, a hard disk, an USB (Universal Serial Bus) storage device, a RAM (Random Access Memory), a ROM (Read Only Memory), a FLASH memory, and an EPROM (Erasable Programmable Read Only Memory). In general, a computer-readable medium may also be a data communication network, e.g. the Internet, which allows downloading a program code.

The application for the mobile device can be configured for: receiving a request for inspecting local equipment in a geographical area from a central computer system; providing assistance for locating a piece of local equipment and for taking a picture of the piece of local equipment; and transmitting the picture to the central computer system.

The application may be adapted for performing all the tasks appropriate for helping a person to inspect a specific piece of equipment and to transmit the generated data back to the central computing system of the power company. For example, the application may provide step-by-step instructions that help persons/customers to produce information that will be exploited by the power company to assess impending or existing damage. Based on this assessment, the company may then initiate adequate maintenance or repair actions.

A further aspect disclosed herein relates to a computer-readable medium, storing an application for a central computer system, the application, when being executed by a processor of the central computer system, being configured for: identifying a geographical area including a presumed faulty piece of equipment; determining a mobile device at the geographical area; sending a request for inspecting local equipment in the geographical area to the mobile device; receiving a picture of a piece of local equipment from the mobile device; and evaluating, whether the piece of local equipment in the picture is faulty or not.

A corresponding application may run in the central computing system, which provides the appropriate information for the mobile application and which gathers the data (pictures with annotations) received from different mobile applications.

A further aspect disclosed herein relates to a method for evaluating a picture of a piece of local equipment of a power system, such as the picture being acquired with a method as described herein. The evaluation step of the method described may be performed with the help of human beings and, for example, their ability to visually evaluate information in pictures.

According to an exemplary embodiment, the method can include: sending a request for evaluating the picture together with the picture to a selected person from a group of registered persons; analyzing the picture by the selected person; and transmitting the analysis result to the central computing system. For example, the task of evaluation of the pictures gathered by the central computing system may be performed by crowd sourcing. It is possible that the person who has taken the picture is also requested to evaluate the picture himself.

According to an exemplary embodiment, analyzing the picture can include answering questions provided by a computing device, the questions including at least one of: whether there is a piece of equipment shown in the picture; whether a piece of equipment shown in the picture is faulty. For example, the evaluation may be performed by an application running in a local computer, for example a mobile device, of the selected person. This application may present the picture to the selected person and may pose the above questions.

According to an exemplary embodiment, the method can include sending the request for evaluating the picture to more than one selected person; and comparing the analysis results of the selected persons. For enhancing the quality of the crowd sourcing, the picture may be sent to a number of persons to test, whether they all answer the questions in the same way.

According to an exemplary embodiment, the method can include automatically preprocessing the picture; and verifying the result of the preprocessing during the analysis of the picture by the selected person. It may be possible that the picture is preprocessed by the central computing system, whether it really shows a piece of equipment and/or whether the piece of equipment looks faulty. The selected person then may only verify whether the preprocessing was correct or not.

These and other aspects of the invention will be apparent from and elucidated with reference to exemplary embodiments described hereinafter.

Figure 1:
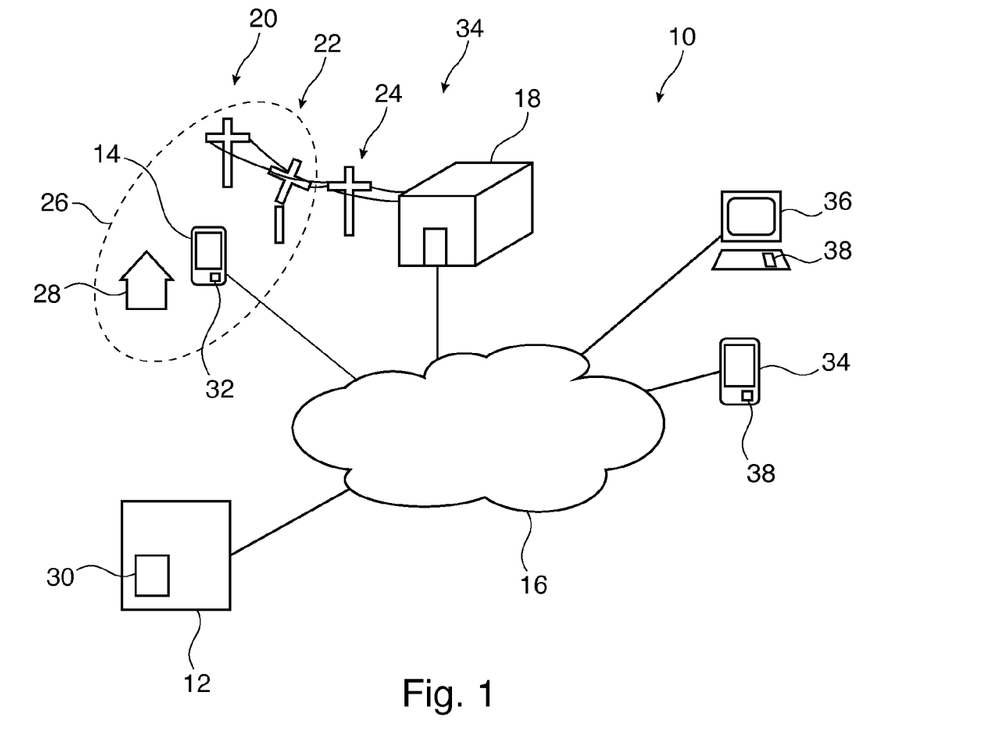
FIG. 1 schematically shows an exemplary system for inspecting equipment of a power system and for evaluating pictures of pieces of equipment of the power system according to an exemplary embodiment disclosed herein.

FIG. 1 shows a system 10 that comprises a central computing system 12 of a power company and a mobile device 14, such as a smartphone or tablet computer, that is communicatively connected via a data communication network 16, such as a mobile phone network and/or the Internet.

FIG. 1 additionally shows a power substation 18 of the power company and (only as examples for pieces of equipment) three power poles 20, 22, 24 wherein the power pole 22 is damaged.

The power poles 20, 22 are located in a geographical area 26, which also includes a house 28 of a customer of the power company, who is the owner of the mobile device 14.

The method may be performed by two software applications 30, 32 in data communication with each other via the network 16, such as a utility application 30 running in the central computing system 12 and a mobile application 32 running in the mobile device 14.

The system 10 assists power company customers and in general persons registered at the central computing system 12 in performing inspection tasks of a power system 34. This is performed by exploiting features of the mobile device 32 such as a photographic camera, GPS (global positioning system), audio recording, etc. to collect situational information and locations regarding the condition of the power system 34.

Figure 2:
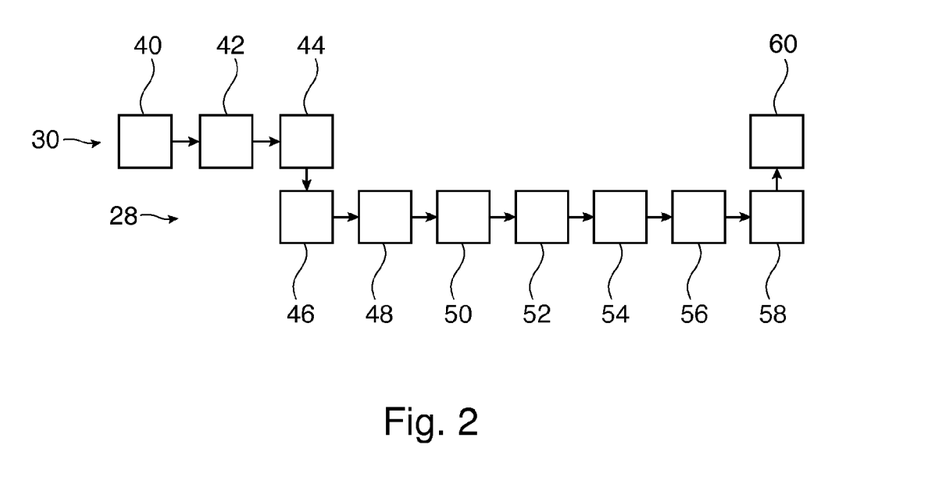
FIG. 2 shows a flow diagram with an exemplary method for inspecting equipment of a power system according to an exemplary embodiment disclosed herein.

FIG. 2 shows an exemplary method that may be performed by the system 10 and, for example, by the utility application 30 in communication with the mobile application 32.

In step 40, the utility application 30 identifies a geographical area 26 including a presumed faulty piece of equipment 22. For example, the geographical area 26 is identified based on weather conditions in the area 26. The central computing system may have received information about a storm or high wind speeds in the area 26.

Alternatively, the geographical area 26 may be inspected in regular intervals and the identification of the area 26 was triggered by a regular event.

Furthermore, it may be possible that a person residing in the geographical area, such as a customer, notices the power company that there is a power outage in the area 26.

In step 42, the utility application 30 determines a person at the geographical area 26. The person may be a customer of the power company and/or a person, who has previously registered for inspecting equipment of the power system 34. During registration, the utility application may determine the address and/or the position of the mobile device 14 and may link the area 26 in this way with the registered person.

In step 44, the utility application sends a request for inspecting local equipment in the geographical area 26 to the person determined during step 42. In general, the application 30 may request to inspect all pieces of equipment 20, 22 in the area 26 or may only request to inspect one specific piece of equipment 22.

The following steps 46 to 58 are performed by the mobile application 32.

Whenever some damage or power outage has been reported in the person's/customer's geographic area 26—either remotely by the power company, by a third-party service (e.g., news agency) or by the customer himself—or periodically, the application 32 asks the registered person/customer in that area for data about the power system 34, e.g. pictures of damaged equipment 22. Persons/customers may also provide unsolicited data if they are the first to notice a problem. The person/customer is guided by the application 32 through the process of providing pictures/videos or other data of (damaged) equipment such as power poles, power lines and transformers.

In step 46, the mobile application 32 receives the request for inspecting local equipment 20, 22 from the central computer system 12. For example, the request for inspecting local equipment may comprise a position/GPS coordinates of a piece 22 of local equipment. The request also may comprise other indications, which special piece of equipment 22 should be inspected. For example, the request may contain an identifier for a piece of equipment (such as a serial number) and the mobile application 32 may receive or store further information regarding the piece of equipment 22 based on the identifier.

In step 48, the application 32 guides the person to a piece of local equipment 22, for example by GPS coordinates associated with the piece of equipment.

In step 50, the person takes a picture of one or more pieces of local equipment 22, assisted by the application 32. For example, in order to assist a non-specialist person, the application 32 may display step-by-step instructions during the data acquisition process. These may be textual instructions, e.g. "Please photograph all power poles on your property". Alternatively, graphical indications can be provided such as sample pictures or "should-be" images of the equipment to be photographed in faultless condition.

In step 52, the mobile application 32 automatically verifies, whether the picture shows an arbitrary piece of equipment 20, 22 of the power system 34 (completely) and/or shows a requested piece of equipment 22. For example, (graphical) feedback about the usefulness of acquired data may be provided to the person using the mobile device 14 in real-time. For instance, a green frame might be displayed around pictures that contain all needed information, whereas a red frame is displayed when they do not. The mobile device 14 may perform some rudimentary data/image processing during the acquisition process. For instance, a power pole detection algorithm may determine whether the photographed picture contains a pole or not.

In step 54, the person may annotate the taken picture, for example, whether the piece of local equipment 22 is faulty or not according to the opinion of the person. The application 32 may assist the person using the mobile device 14 in performing this task. In particular, many meaningful data interpretation tasks are simple to perform for human observers, but extremely difficult for machines. For example, it is easy for a person to determine whether a power pole or transformer is damaged. Therefore, after data acquisition, some simple information about the acquired data might be requested from the user, e.g. whether the photographed equipment is damaged or not.

In step 56, the application 32 may determine a position of the mobile device 14, when taking the picture. In order for the power company to locate the origin of damages and failures, geographical identification metadata ("geo-tagging") may be added to the transmitted data/pictures. Such information may stem from GPS and/or directional data provided by the mobile device 14 or may be added manually by the person using the mobile device 14.

In step 58, the picture, the geo-tagging information, the annotations are transmitted to the central computer system 12 and the utility application 30.

In step 60, the utility application evaluates at the central computer system 12, whether the piece of local equipment in the picture is faulty or not. The received data is then used by the power company to assess the state of the power system 34 remotely. Based on this, it may be decided on possible maintenance and repair actions. It has to be noted that the evaluation step 60 may be supported by crowd sourcing as explained above and with respect to FIG. 4.

As an incentive, customers and/or registered persons may be engaged in a reputation strategy that rates the quality of their observations and allows endorsement between motivated customers/persons on a utility-provided social network. Additionally, customers/persons may be offered monetary or other compensation for each useful information (e.g., picture) supplied to the power company. This may be in the form of a discount on upcoming electricity bills.

With respect to FIG. 3A to 3F, a possible application scenario is described in more details. Each of the FIG. 3A to 3F shows a screenshot or display screen of the mobile device 14 generated by the mobile application 32.

Figure 3A:
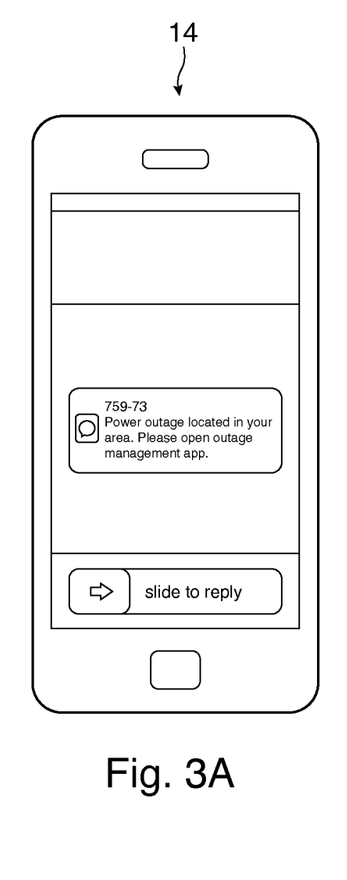
FIGS. 3A to 3F show display screens of a mobile device performing a method for inspecting equipment of a power system according to an exemplary embodiment disclosed herein.

FIG. 3A shows a screenshot after a power outage in a particular geographical area 26 has been signaled to the power company. The cause and exact location of the outage as well as possible damage to the network are unknown at this point. For example, triggered by the company, all customers in/around the affected geographical area are requested to activate the outage management app (SMS or push notification).

Figure 3B:
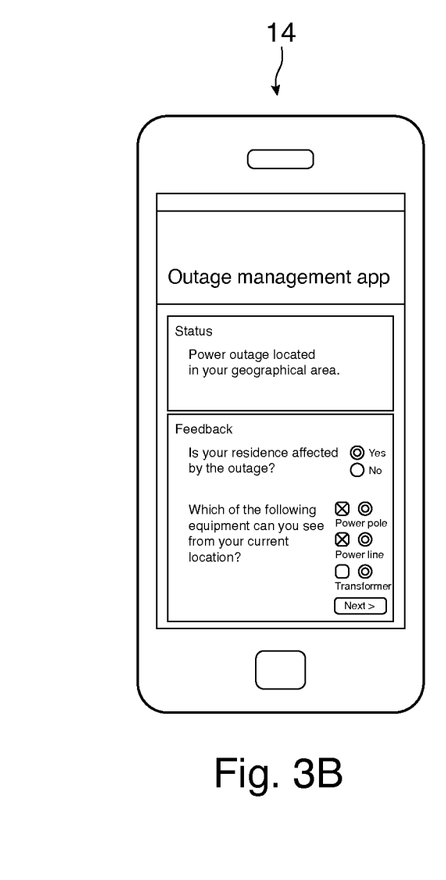

FIG. 3B shows a screenshot in which customers are asked some simple questions, e.g. whether they are affected by the outage and whether they can see electrical equipment from their current location.

Figure 3C:
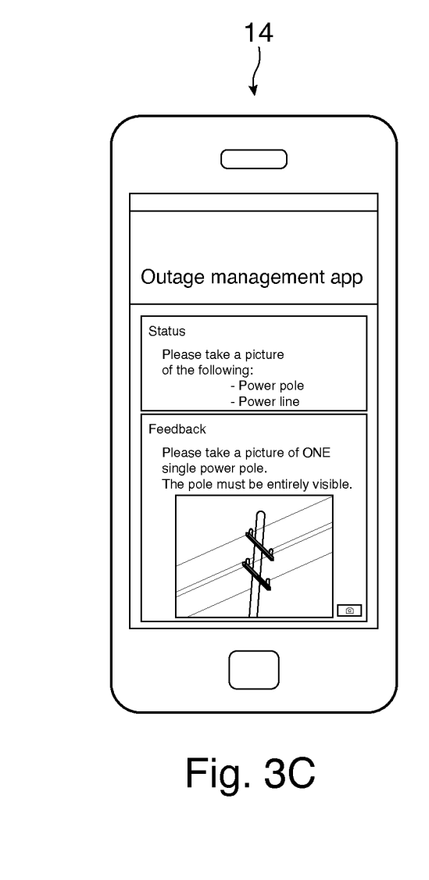

FIG. 3C shows a screenshot in which a customer is asked to photograph (some of) the visible equipment. Detailed instructions are displayed, e.g. "Please take a picture of ONE single power pole". Alternatively, expert users might be guided (e.g., by GPS navigation) to a remote location in order to photograph equipment. Here also, the application 32 may provide further guidance. E.g., "Please point your camera at the broken mast", or "Please move as close as possible to the transformer before taking the picture". Optionally, following of these instructions may further be automatically verified by the application 32 by means of some rudimentary image processing.

Figure 3D:
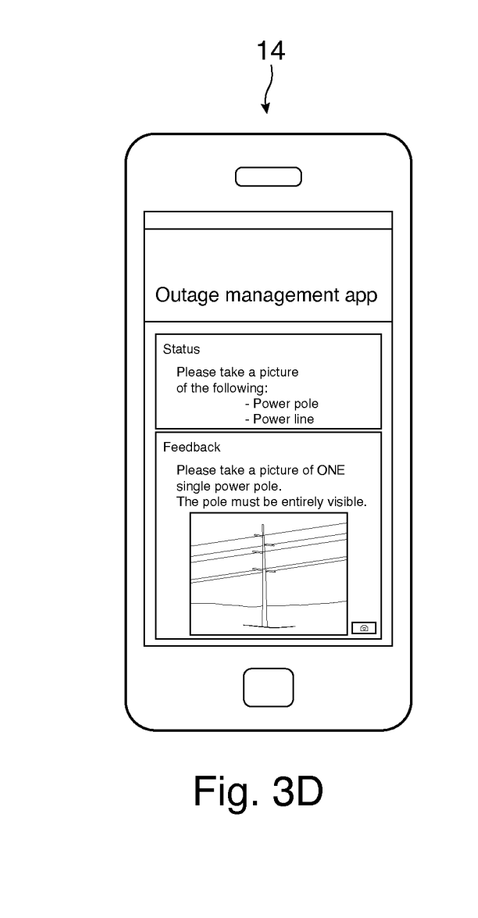

FIG. 3D shows a screenshot after the photographed picture has been analyzed by the phone/tablet computer 14 in order to ascertain that it fits the power company's needs. Feedback is provided in textual or graphical form, e.g. by displaying a red (invalid image) or green frame (valid image) around the picture.

Figure 3E:
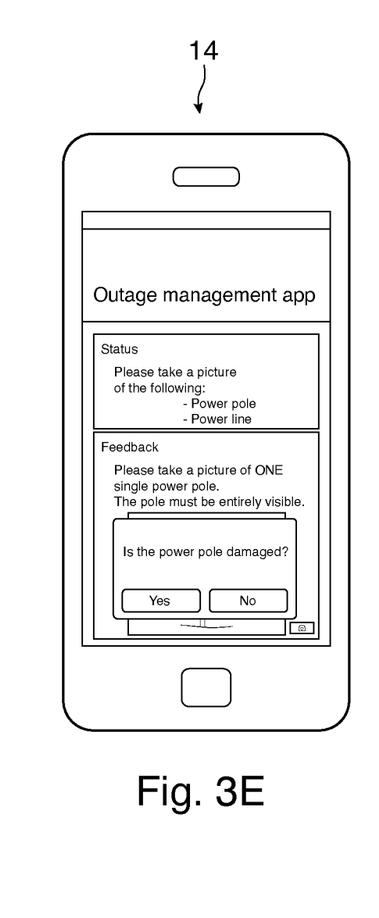
Figure 3F:
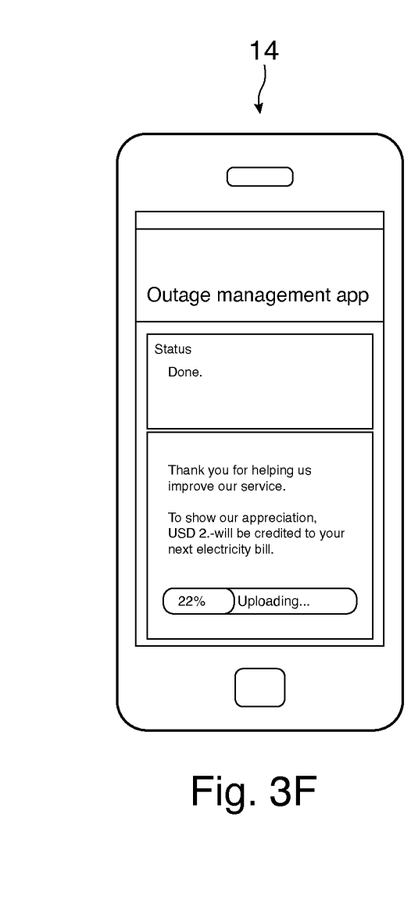

FIG. 3E shows a screenshot in which the customer optionally may be asked some elementary questions about the picture. E.g., "Does the photographed power pole appear to be damaged?" Additionally an audio recording might be requested to determine if there is an intermittent short to ground or other safety risk.

FIG. 3E shows a screenshot during uploading of the picture. Once the picture has been validated and annotated, it is transmitted to the power company along with a geolocation tag (GPS coordinates, phone orientation as captured by the accelerometer, annotations by the user (power pole condition, etc.)). The company will use all collected data to assess the network state remotely and to decide on possible maintenance and repair actions.

Figure 4:
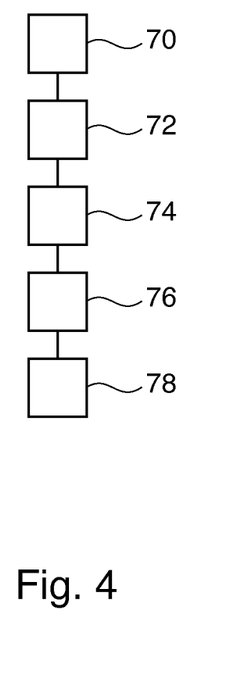
FIG. 4 shows an exemplary flow diagram with a method for evaluating pictures of pieces of equipment of the power system according to an exemplary embodiment disclosed herein.

FIG. 4 shows a method for evaluating a picture of a piece of local equipment of a power system 34, wherein the picture may have been acquired with the method as described with respect to FIG. 2. The method of FIG. 4 may be employed for performing step 60 of the method of FIG. 2.

In general, image analysis of the picture is delegated to human workers (i.e. persons), either as a paid task, an unpaid game or some other unpaid side task (like "captcha", for example). This approach of obtaining needed services by soliciting contributions from a large group of people—and especially from an online community—rather than from traditional employees may be referred to as crowd sourcing.

FIG. 1 shows a further mobile device 34 and a stationary computer 36 that may be employed during the method of FIG. 4. For example, the central computing system and in particular, the utility application may send the picture (or a plurality of pictures) via the data communication network 16 to the devices 34, 36, which run an application 38 that is adapted for assisting a human worker in image analysis.

The central computing system 12 may manage the whole workflow of the methods of FIG. 1 and FIG. 4. The central computing system may be further responsible for image acquisition (multi-tenanted system to be used as back-end for many (utility) customers, image preprocessing and basic annotation (optional), worker management, crowd sourcing (task submission and response collection), statistical quality assurance (comparison of response per picture and per worker), re-integration of pictures with human-analysis metadata into utility outage management system, worker payment and/or utility/tenant service billing and reporting.

Before performing the method of FIG. 4, situational data (pictures/video of damaged and intact electrical equipment, surroundings, etc.) has to be collected by the central computing system 12. The input data (images, video, geolocation data) may, for example, originate from the power company (e.g., photos taken by maintenance teams) or from customers who have been incited to collect the data by the company (e.g., via an "outage management app").

In optional step 70, the utility application 30 automatically preprocessing the picture (or all collected material) in the central computing system, for example to the extent that is feasible and economical in terms of computational capacity and time required. During the preprocessing step, the pictures may be classified using basic signal processing (e.g., filter out images that stem from an area without electrical equipment) and/or may be annotated by the content provider (e.g., "the visible equipment is damaged").

In step 72, the utility application sends a request for evaluating the picture together with the picture to a selected person from a group of registered persons. The persons or workers may have registered themselves at the central computing system 12. For example, simple by accident, for each request one or more persons are selected from this pool of persons.

It is possible that the request for evaluating a specific picture is sent to more than one selected persons.

In step 74, the picture is analyzed by the selected person (s). The main idea is that a large group of unskilled people—in particular an online community—performs image analysis tasks needed for electrical networks inspection. This approach may be called crowd sourcing.

To this end, the picture is displayed by the application 38 on the respective device 24, 26 to the selected person. The application 38 furthermore may provide questions, whether there is a piece of equipment shown in the picture and/or whether a piece of equipment shown in the picture is faulty. For example, the human analysis tasks may be phrased as simple true/false or multiple-choice questions, which are provided by the application 38.

Also during step 74, the result of a possible preprocessing of the picture may be verified by the selected person(s).

In step 76, the application 38 transmits the analysis result to the central computing system 12 and to the utility application 30.

In step 78, the analysis results are collected by the utility application 30 and may be the basis for further decisions, like maintenance tasks and order of repair material.

In the case, more than one selected person is requested for analyzing the same picture, the analysis results of the selected persons may be compared with each other and, for example, the quality of the assessments of the persons may be investigated.

Furthermore, the output of the crowd sourcing process may be used to refine automatic preprocessing, the preprocessing parameters/algorithms may be improved based on feedback from crowd sourcing.

The method furthermore may allow validating correctness of human input from different sources, thereby increasing reliability. For instance, an image of damaged electrical equipment along with some basic annotation (e.g., "the fallen power mast in my garden") may be submitted by a power company customer, e.g. via MMS. The crowd sourcing then verifies and extends the classifications.

Crowd sourcing further allows distributing inspection tasks to unskilled people in low-wage areas, thus reducing cost.

The method of FIG. 4 is illustrated with the following example: After a storm, many power lines and power poles may be damaged. The power company needs to know where there are damages, and what type these damages are. It is possible to collect (geo-tagged) picture/video data of the affected infrastructure by using webcams, UAVs, or customer submitted images and/or the method of FIG. 2.

A computerized preprocessing step may extract pictures where it recognizes power infrastructure with sufficient (but not necessarily very high) probability. These pictures are then accessible from PCs/smartphones/feature phones to a pool of paid-by-click/volunteer workers around the world to answer questions like Is there a power pole on the picture: yes/no?
Does the power pole look damaged: yes/no?
Is the power pole broken/shifted out of position/has a broken power line/otherwise damaged?

For quality assurance, the same picture may be submitted to multiple independent workers.

Payment may then be determined by the results quality. In this case, human judgment will be used for image analysis tasks that are hard for computers to perform, like "recognize a power pole, which can have multitude of variants" or "recognize whether something is (visibly) damaged". For the workers, this is an opportunity to earn money without requiring special skills.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of evaluating a piece of equipment of a power transmission or distribution system, the method comprising:
    identifying a geographical area including a presumed faulty piece of equipment with a central computer system, the presumed faulty piece of equipment being a piece of equipment of the power transmission or distribution system comprising masts and/or power poles, power lines and/or overhead lines, transformers, breakers and switches, and the geographical area being identified by a condition of electricity supply in the geographical area;
    determining a contact at the geographical area comprising registering a person at the central computer system, receiving GPS coordinates of a mobile device of the person in the central computer system, and determining the person by checking whether the GPS coordinates of the mobile device are at the geographical area;
    sending a first request to the mobile device for inspecting local equipment in the geographical area to the contact, wherein the request includes GPS coordinates of the presumed faulty piece of equipment and a request for annotation;
    guiding the contact with the mobile device to the presumed faulty piece of equipment by the GPS coordinates;
    taking a picture with the mobile device, via the contact, of the presumed faulty piece of equipment;
    annotating the picture on the mobile device, as to whether the presumed faulty piece of equipment is faulty or not according to an opinion of the contact;
    determining GPS coordinates with the mobile device of the contact, when taking the picture;
    transmitting the picture from the mobile device to the central computer system;
    sending a second request for evaluating the presumed faulty piece of equipment together with the picture and annotation to a selected person from a group of registered persons for analysis; and
    transmitting an analysis result from the selected person to the central computing system.

2. The method of claim 1, wherein the geographical area is further identified based on at least one of:
    weather conditions in that area and a person residing in the geographical area.

3. The method of claim 1, wherein the request for inspecting local equipment is indicates a specific piece of local equipment, including one of the masts and/or power poles, power lines and/or overhead lines, transformers, breakers and switches.

4. The method of claim 1, comprising:
    before transmitting the picture to the central computer system, automatically verifying, whether the picture shows a piece of equipment of the power transmission or distribution system.

5. The method of claim 1, wherein analyzing the picture comprises:
    answering questions provided by a computing device, the questions including at least one of:
    whether there is a piece of equipment shown in the picture;
    what type of piece of equipment is shown in the picture;
    whether a piece of equipment shown in the picture is faulty.

6. The method of claim 1, comprising:
    sending the second request for evaluating the picture to more than one selected person for analysis; and
    comparing analysis results of the selected persons.

7. The method of claim 1, wherein the first request further includes an archived picture of the presumed faulty piece of equipment.

8. The method of claim 1, wherein the contact is a customer of a power company operating the power transmission or distribution system.

* * * * *